INVENTOR.
NORMAN W. SCHULER

United States Patent Office 3,711,417
Patented Jan. 16, 1973

3,711,417
MULTILAYER LIGHT POLARIZING LENS
Norman W. Schuler, Lexington, Mass., assignor to
Polaroid Corporation, Cambridge, Mass.
Continuation-in-part of application Ser. No. 75, Jan. 2,
1970. This application July 1, 1970, Ser. No. 51,522
Int. Cl. F21v 9/00
U.S. Cl. 252—300   15 Claims

ABSTRACT OF THE DISCLOSURE

Synthetic plastic light-polarizing ophthalmic lenses comprising an acrylic polymer.

---

This application is a continuation-in-part of copending application Ser. No. 75, filed on Jan. 2, 1970, in the name of Norman W. Schuler, now abandoned.

This invention relates to synthetic plastic light-polarizing ophthalmic lenses, and particularly to light-polarizing ophthalmic lenses which have been produced by casting a reactive solution in a mold.

The generic process of producing synthetic plastic light-polarizing ophthalmic lenses by placing a light-polarizing member into a mold; placing a monomer of an optical quality polymeric material on either side of said light-polarizing member; and causing such monomer to polymerize in situ has been disclosed in U.S. Patent application Ser. No. 726,141, filed on May 2, 1968 in the name of Norman W. Schuler. Production of synthetic plastic lenses according to the process disclosed in the denoted Schuler application, however, has been found, in some instances, to produce strains in the plastic material during the polymerization process.

Casting of lenses according to the present invention involves conveying a material, in liquid form, into a mold or die where it forms a solid in situ, and the subsequent removal of the cast part. In accordance with the present invention, cast parts are provided which are substantially flawless, optically substantially identical to the mold configuration, and, of prime importance, are not subject to substantial nonuniform shrinkage during the casting operation and consequent strain production.

It is apparent that by utilizing very tough polymeric material, lenses fabricated thereof will be highly abrasion-resistant. It has been found that certain acrylic type polymers, as defined below, provide lenses with extraordinary toughness and abrasion-resistance characteristics which can be fabricated more economically than synthetic plastic ophthalmic lenses heretofore known.

Accordingly, it is an object of the present invention to provide acrylic type materials for the manufacture of light-polarizing ophthalmic lenses.

It is another object of the present invention to provide new and improved synthetic plastic light-polarizing ophthalmic lenses which are tough, highly abrasion-resistant and have very high tolerance to fracture.

It is a further object of the present invention to provide a new and improved economical process for the preparation of substantially strain-free light-polarizing ophthalmic lenses.

The invention accordingly comprises the process involving the several steps and the relation of one or more of such steps with respect to each of the others and the product possessing the features, properties and relation of elements which are exemplified in the following detailed disclosure and the scope of the application of which will be indicated in the claims.

For a fuller understanding of the nature and objects of the present invention, reference should be had to the following detailed description taken in connection with the accompanying drawing wherein.

Figure 1:
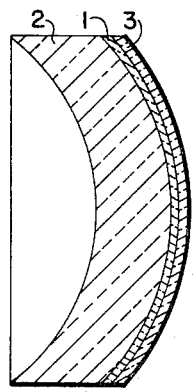
FIG. 1 is a side cross-sectional view of a lens element of the present invention.

The present invention is concerned with the formation of lenses by the injection of a member of a certain class of acrylic materials into a mold or die on both sides of a light-polarizing element, causing the acrylic material to solidify in situ in the mold configuration, and removing the molded part. The materials utilized in the fabrication of the lenses of the instant invention comprises a class of acrylic polymers, preferably methacrylates, although acrylate compounds may also be utilized.

The particular class of materials contemplated for use herein is prepared by reacting a 2-[2-(ethoxy)$_x$ethoxy] ethanol, where $x$ is an integer from 2 to 5, inclusive, and preferably the compound where $x$ is 2, with a compound of the formula:

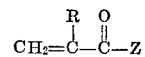

where R is hydrogen or methyl and Z is lower alkoxy containing from 1 to 4 carbon atoms, chlorine or hydroxy, as, for example, methyl methacrylate, methacrylyl chloride, etc. A typical reaction in structural form appears below:

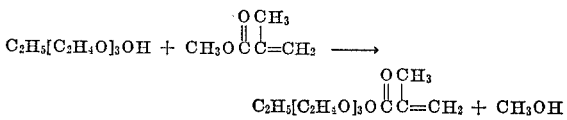

The ethylenically unsaturated reaction product is then polymerized by a conventional acrylic polymerization technique in the presence of a suitable catalyst such as benzoyl peroxide, azobisisobutyronitrile, diisopropyl percarbonate, methylethyl ketone peroxide, etc.

The toughness of the polymeric materials of the present invention is attributed to the flexibility imparted thereto by the multiple ether linkages. As a result, these materials are more abrasion-resistant then most synthetic plastic polymeric materials, which have been heretofore used in fabricating plastic lenses. A referred reactant, 2-[2-(ethoxy)$_2$ethoxy]ethanol is commercially available from Baker Chemical Company, Phillipsburg, N.J.

The principal lens contemplated by the present invention, which will be more fully discussed below, is supplied to optical laboratories, usually in a semi-finished form, for distribution. Due to limitations in modern grinding and polishing equipment for plastics, the front, or convex surface of the lens is preferably cast into its finished configuration at the time of manufacture. The concave surface, however, is preferably formed into a variety of diopters which encompasses a range of plus or minus corrections. Any given particular prescription may be prepared by selecting a lens with an optical configuration close to the prescribed dimensions, followed by grinding and polishing the concave surface according to the exact prescription required. It is evident that in certain circumstances the configuration of the lens may conform to the desired prescription without further grinding or polishing.

Any suitable polymeric light-polarizing sheet material which will produce the desired light-polarization effect may be utilized in the context of the present invention. However, the preferred material is a transparent sheet of polyvinyl alcohol containing substantially oriented molecules of dehydrated polyvinyl alcohol and deriving its light-polarizing properties essentially from said dehydrated molecules. The manufacture and utilization of such sheet material may be appreciated with reference to U.S. Pats. Nos. 2,173,304; 2,255,940, 2,306,108; 2,445,555; 2,453,186; and 2,674,159, all incorporated herein by reference. Among other materials which may be utilized as light polarizers in the present invention are, for example, polyvinyl butyral and polyvinyl alcohol used in conjunction with a dichroic strain.

Referring to FIG. 1 of the drawings, there is illustrated a cut-away view of a typical lens structure according to the present invention. Elements 2 and 3, with concave and convex external surfaces, respectively, comprise polymeric material in contact with light-polarizing element 1. The convex surface of element 3 assumes the surface characteristics of the mold member against which it was formed, said surface comprising a configuration which, in conjunction with grinding or otherwise altering the concave surface 2, will provide a range of prescriptions which may be used in optical devices to aid the eyesight of the user.

Figure 2:
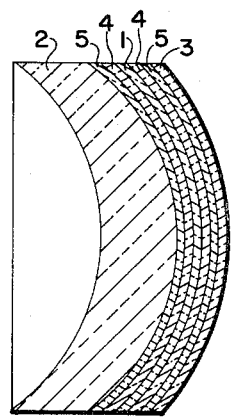
FIG. 2 is a side cross-sectional view of another lens element of the present invention.

Referring now to FIG. 2, which depicts the most desired embodiment of the present invention, elements 1, 2 and 3 are as described above. Elements 4, on either side of light-polarizing element 1, comprise transparent plastic material which acts as supports for element 1, and on each side of elements 4, opposed to element 1, is a thin coating of a tie-coat material, denoted 5.

Figure 3:
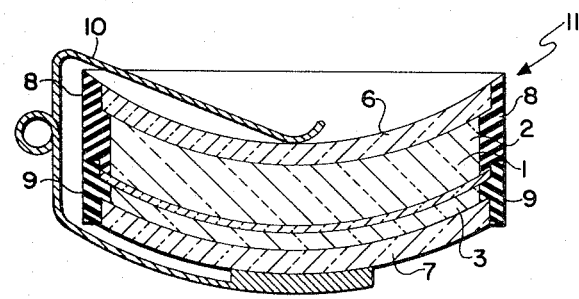
FIG. 3 is a side cross-sectional view of a lens being formed in a suitable mold according to the present invention.

Referring now to FIG. 3, elements 1, 2 and 3 are depicted in mold 11, which is composed of resilient body elements 8 and 9 and rigid elements 6 and 7. The material between the light polarizer and elements 6 and 7, respectively, is inserted by injection through the resilient member of the mold. The assembled mold is securely held together by clamp element 10. However, it should be understood that any suitable means of holding the mold together, such as, for example, lips on the resilient body member, may be utilized.

In a preferred embodiment of the present invention, the light-polarizing material is sandwiched between relatively thin layers of an optical quality transparent polymeric material which serves to support said light-polarizing material. Among the materials which may be utilized for this purpose are cellulose acetate butyrate, methyl methacrylate, cellulose acetate, cellulose triacetate, etc. Cellulose acetate butyrate is preferred. The bond between the light-polarizing element and the polymeric support material may be accomplished, for example, according to the methods of Buzzell and Bloom, U.S. application Ser. Nos. 577,578 and 577,576, now U.S. Pats. 3,628,888 and 3,588,216, respectively, both incorporated herein by reference. It will be appreciated from a reading of the above applications that lamination of a cellulose acetate butyrate support material to a typical polarizing sheet as, for example, one comprising polyvinyl alcohol, may be accomplished either by subcoating the cellulose acetate butyrate material with a suitable compound such as, for example, cellulose nitrate, and then laminating the subcoated material to the polyvinyl alcohol light-polarizing sheet using a well-known pressure roll technique with a typical adhesive for such materials such as, for example, a two percent polyvinyl alcohol solution, or alternatively, the lamination may be accomplished by the conversion of the surface of the cellulose acetate butyrate to cellulose, subcoating the surface with polyvinyl alcohol, and pressure laminating the subcoated cellulose acetate butyrate to the light-polarizing material, as more fully disclosed in the Buzzell application mentioned above.

In the most preferred embodiment, it is additionally desirable to use a tie coat between the light-polarizing element and the outer polymeric element. Any material which will increase the adhesion of the elements, each to the other, without adversely affecting the final structure, is suitable for use. It has been found that cellulose nitrate produces excellent results when used in this environment, and is therefore preferred.

It is considered desirable to incorporate both ultraviolet and infrared absorbing dyes in the lenses of the present invention. In the ultraviolet portion of the spectrum, the energy of natural sunlight is sufficiently strong to break many molecular bonds. These ruptured bonds bring about the rapid oxidation of plastics that result in discoloration and ultimate embrittlement of the polymer. In addition, large amounts of ultraviolet radiation have been found to have a deleterious effect on human eyesight.

Ultraviolet absorbers preferentially absorb large amounts of ultraviolet energy and are able to re-emit it at nondestructive wavelengths. In addition, an effective ultraviolet light absorber must be stable to heat and light, be compatible with its polymeric host and add as little color as possible thereto.

A variety of ultraviolet light-absorbers are available and include: the 2-(2′-hydroxyphenyl) benzotriazoles, the 2-hydroxybenzophenones, the substituted acrylonitriles, the salicylic acid derivates, the 2-hydroxyphenyl diazines, etc. These materials generally absorb in the 300 to 400 m$\mu$ region of the light spectrum and may be utilized in a variety of molecular configurations to provide proper compatibilities, volatility and wash fastness.

There are three primary techniques for introducing both the infrared and the ultraviolet absorbing dyes to the lens structure of the instant invention. These comprise either dissolving the dye in the solution before casting; incorporating the dye in the light-polarizing structure; and absorbing the dye into the finished lens product by dipping.

Preferably, the third technique denoted above comprises the incorporation of, for example, infrared absorbing dye material in a cellulose acetate layer of the light-polarizing structure. In order to protect the dye material during injection and solidification of the refractive elements, it is beneficial to coat the light-polarizing structure on the side containing the dye material with a barrier layer comprising, for example, polyvinyl imine. Preferred infrared radiation absorbing dyes are disclosed in U.S. patent applications of Stanley M. Bloom, assigned to Polaroid Corporation, Ser. Nos. 557,576 and 880,614. The preferred infrared absorptive system comprises a mixture of

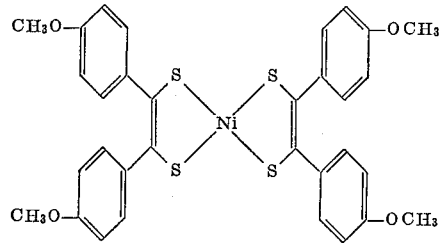

and

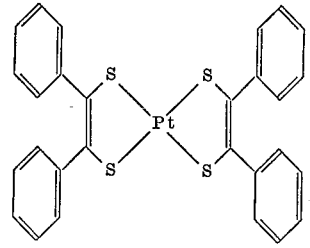

in a weight ratio of about 1.8:1.

Less preferred, but effective, is an infrared radiation reflective system comprising a metallic film, preferably of gold, as disclosed in Belgian Patent No. 729,300 and U.S. Patents Nos. 2,854,349; 3,087,802; and 3,118,781. The metallic film will preferably be positioned between the light-polarizing element and a cellulose acetate butyrate protective layer, or between a cellulose acetate butyrate protective layer and one of the refractive elements solidified in situ.

In actual operation, the mold, as depicted in FIG. 3, is preferably constructed with outer rigid mold element, preferably comprising glass of the desired configuration, and a resilient body element constructed, for example, of rubber, adapted to secure a light-polarizing element therein. The resilient body element is preferably cylindrical; however, within the context of the present invention, it may assume any desired transverse cross-sectional configuration as, for example, rectangular, square, elliptical, etc. Using a suitable syringe, material of which the elements comprising the refractive lens surfaces may be injected through the resilient area into the mold on both sides of the light-polarizing element. The entire structure is allowed to stand at room temperature until the polymer is cured, at which time the mold is disassembled and a finished composite lens is removed. In certain instances heat may be added to accelerate the curing, according to the system employed and the desires of the operator.

In the most preferred embodiment of the present invention, the acrylic polymeric material described above is dissolved in a reactive solvent therefor, such as additional monomer, difunctional monomers soluble therewith to form cross-linked structures such as various epoxy, vinyl, acrylic, etc. monomers, etc. The resultant solution comprising the dissolved polymer is then injected into a mold containing a light-polarizing element and cast into the ultimate lens configuration. Since formation of lens elements utilizing the polymeric materials of the present invention does not rely primarily on in situ polymerization, shrinkage and concomitant strains are substantially eliminated.

It has been disclosed in the aforementioned U.S. patent application Ser. No. 726,141 that utilizing polyethylene glycol dimethacrylate in a lens casting operation, only about eight minutes of cure time is required at room temperature. There are, as aforenoted, pronounced strain patterns set up in the polymer which tend to militate against its use. It has been found, however, that if the polyethylene glycol dimethacrylate is utilized as a solvent for the thermoplastic acrylic type polymeric material described hereinabove, the polyethylene glycol dimethacrylate, by cross-linking in admixture with the above-denoted acrylic-type polymer, will form a highly abrasion-resistant lens without imparting substantial strains thereto. The above-described acrylic polymer and a suitable polymerization catalyst are preferably dissolved in the polyethylene glycol dimethacrylate monomer immediately prior to the molding operation and provides the most preferred embodiment of the present invention. The abrasion-resistance of this material and its corresponding toughness is, to an extent, the result of cross-linkage and/or the dipole of the double-bond linkage, as, for example, the ethylene-glycol linkage.

Any catalyst compatible with the monomeric material utilized in the present invention may be employed. Examples of suitable catalysts are diisopropyl percarbonate, benzoyl peroxide, azobisisobutyronitrile, methylethyl ketone peroxide, etc. In the preferred systems of the present invention, diisopropyl percarbonate has been found to give good results when utilized in proportions of approximately one-half to three percent based upon the weight of the monomer.

While the above-described casting technique, as further discussed below, is preferred, lenses of the instant invention may be made by other methods, as, for example, injection molding a melt comprising the acrylic polymers described herein and allowing such to cool. Cross-linking of such lenses may be provided, if desired, for example, by beta ray bombardment.

In order to provide a desired color to the lenses of the present invention, various dyes may be incorporated therein by being absorbed on the surface of the polymeric material. In addition to the ultraviolet radiation absorber and the infrared radiation absorber described above, visible light attenuation dyes, etc., may be added to the system to provide further benefits to the disclosed lenses.

The light-polarizing element utilized in the present invention is preferably preformed to adequately conform to the respective configurations of the plastic elements which are to be polymerized on either side thereof. Accordingly, it will be apparent that the more extreme configurations in the convex and concave elements will require concomitant deviations in the shape of the light-polarizing element from the planar configuration. In addition, in order to avoid light refraction problems, the preformed curvature of the light-polarizing element should be approximately the same as the curvature of the convex surface of the lens. Also in order to prevent injuring the light-polarizing element during grinding and polishing of the concave surface, the light-polarizing element should be situated reasonably close to the convex surface of the lens. Preforming of the light-polarizing element is preferably accomplished by a conventional thermopressing operation.

The instant invention may be further appreciated with reference to the preferred embodiment wherein a sheet of light-polarizing material comprising partially dehydrated polyvinyl alcohol, each face of which has bonded thereto a layer of cellulose acetate butyrate approximately 5 mils. in thickness—said cellulose acetate butyrate layers having integral therewith a light-attenuating dye material—may be roll-coated on both surfaces thereof with a thin layer of cellulose nitrate; pressed to an arcuate configuration between heated platens; cut in a circular configuration; and secured into a cylindrical resilient mold body element along with glass mold elements possessing desired surface characteristics on the side of each glass element adjacent to said light-polarizing material. About one-half percent by weight of diisopropyl percarbonate catalyst is added to

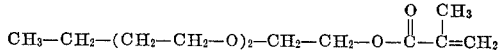

monomer, the preparation of which is described above, and the resultant polymer and additional catalyst is dissolved in polyethylene glycol dimethacrylate monomer. The solution is injected through the resilient mold body element on each side of said light-polarizing element, utilizing a suitable syringe in a conventional manner. The structure is allowed to stand at room temperature until the material is cured thereby providing cross-linked polyethylene glycol dimethacrylate in admixture with the polymer dissolved therein, at which time the mold is disassembled and a finished composite lens is removed. In the production of a high molecular weight polymeric structure, as little as 20%, by weight, of, for example, 2-[2-(ethoxyethoxy)ethoxy]ethanol-acrylic polymer may be utilized; while, in a low molecular weight polymeric configuration, between 50% and 80%, by weight, acrylic polymer may be utilized.

The plastic lenses of the present invention may be produdced in a blank, or unfinished form, and may subsequently be ground and polished, if necessary, using the same technology and major equipment utilized on crown glass. However, as alluded to above, in the event that grinding and polishing is performed, the operations will preferably be carried out on the concave surface of the lens, since in the preferred embodiment, nearly the full range of possible prescriptions will have been cast into the convex surfaces of lenses from which the operator may choose. It is estimated that in order to fully accomplish this goal, between four and five hundred different convex configurations will be utilized in producing a full range of lenses for ophthalmic use. While the primary purpose of the present invention is to provide ophthalmic lenses capable of being ground to any given prescription, it will, of course, be appreciated that lenses cast in a planar configuration for use without alteration is contemplated herein.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A synthetic plastic light-polarizing ophthalmic lens comprising a light-polarizing element interposed between, and bonded to, molded elements comprising an optical quality synthetic polymeric material comprising the polymerization product of a monomer represented by the formula

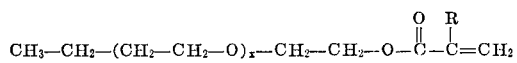

where $x$ is an integer from 2 to 5, inclusive, and R is hydrogen or a methyl group.

2. The invention of claim 1 wherein said synthetic polymeric material additionally comprises polyethylene glycol dimethacrylate.

3. The invention of claim 1 wherein said light-polarizing element comprises a transparent sheet of polyvinyl alcohol containing substantially oriented molecules of dehydrated polyvinyl alcohol.

4. The invention of claim 3 wherein said light-polarizing element is supported between thin, uniform layers of a transparent, optical quality, synthetic polymeric material, which are interposed between and bonded to said molded elements.

5. The invention of claim 4 wherein said layers of transparent, optical quality, synthetic polymeric material comprise cellulose acetate butyrate.

6. The invention of claim 5 wherein said lens additionally contains a light-attenuating dye material.

7. The invention of claim 6 wherein said lens additionally contains a material for impeding the transmission of infrared radiation by reflection or absorbtion.

8. The invention of claim 7 wherein said system comprises infrared radiation absorptive dye material.

9. The invention of claim 8 wherein said infrared absorptive dye material comprises a mixture of

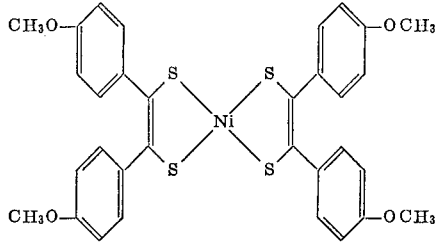

and

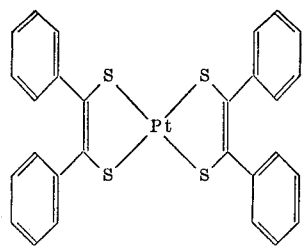

10. The invention of claim 9 wherein said dye material is contained in one of said layers of cellulose acetate butyrate.

11. The invention of claim 7 wherein said system comprises an infrared radiation reflecting metallic layer.

12. The invention of claim 11 wherein said metallic layer comprises gold.

13. The invention of claim 7 wherein said lens additionally contains an ultraviolet radiation absorbing dye material.

14. A composite synthetic plastic light-polarizing lens having a concave and a convex surface comprising:
   a light-polarizing element which comprises a transparent sheet of polyvinyl alcohol containing substantially oriented molecules of dehydrated polyvinyl alcohol;
   thin, uniform support elements comprising cellulose acetate butyrate bonded to each face of said light-polarizing element; and
   lens elements bonded to each of said support elements comprising in admixture polyethylene glycol dimethacrylate and the polymerization reaction product of a monomer represented by the formula

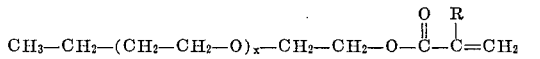

where $x$ is an integer from 2 to 5, inclusive, and R is hydrogen or a methyl group.

15. The invention of claim 14 wherein $x$ is 2.

References Cited

UNITED STATES PATENTS

| | | | |
|---|---|---|---|
| 3,019,131 | 1/1962 | Haas et al. | 117—119.6 |
| 2,241,415 | 5/1941 | Moulton | 88—54.5 |
| 3,488,215 | 1/1970 | Shepherd et al. | 117—124 |
| 3,554,787 | 1/1971 | Plymale | 117—72 |
| 2,263,249 | 11/1941 | Rogers | 88—65 |
| 3,516,720 | 6/1970 | Maver | 350—2 |
| 3,135,645 | 6/1964 | Burkley et al. | 161—165 |
| 3,400,156 | 9/1968 | Millonis et al. | 260—576 |

JOHN C. COOPER III, Primary Examiner

U.S. Cl. X.R.

351—159, 163, 166; 18—1